United States Patent [19]
Ara et al.

[11] Patent Number: 5,544,207
[45] Date of Patent: Aug. 6, 1996

[54] APPARATUS FOR MEASURING THE THICKNESS OF THE OVERLAY CLAD IN A PRESSURE VESSEL OF A NUCLEAR REACTOR

[75] Inventors: Katsuyuki Ara; Nobuya Nakajima; Noriya Ebine, all of Ibaraki-ken, Japan

[73] Assignee: Japan Atomic Energy Research Institute, Tokyo, Japan

[21] Appl. No.: 319,630

[22] Filed: Oct. 7, 1994

[30] Foreign Application Priority Data

Oct. 8, 1993 [JP] Japan ................................. 5-252949

[51] Int. Cl.⁶ ............................ G21C 17/01; G01B 7/10
[52] U.S. Cl. ................................... 376/249; 324/230
[58] Field of Search ............................ 376/245, 249, 376/258; 324/229, 230, 235

[56] References Cited

U.S. PATENT DOCUMENTS

| | | | |
|---|---|---|---|
| 2,679,628 | 5/1954 | Matthews | 324/230 |
| 3,440,527 | 4/1969 | Steingroever | 324/230 |
| 4,507,609 | 3/1985 | Madewell | 324/230 |
| 4,553,095 | 11/1985 | Schenk, Jr. et al. | 324/230 |
| 5,343,146 | 8/1994 | Koch et al. | 324/230 |

OTHER PUBLICATIONS

"Eddy Current Type Coated Film Thickness Sensor," Section 4, *Magnetic Sensor Manual*, Madwell, pp. 14–15, date unknown.

*Primary Examiner*—Daniel D. Wasil
*Attorney, Agent, or Firm*—Banner & Allegretti, Ltd.

[57] ABSTRACT

A method of and an apparatus for measuring the thickness of the overlay clad of the pressure vessel of a nuclear reactor with good accuracy are disclosed. A magnetic yoke having an appropriate length and cross-sectional area of the magnetic path is placed closely in contact with the surface of the overlay clad of the pressure vessel of the nuclear reactor to form a magnetic path by the magnetic yoke and the pressure vessel of the nuclear reactor, the magnetic yoke is magnetized, the distribution of the magnetic field on or near the surface of the overlay clad in contact with which the magnetic yoke is closely placed is measured and the thickness of the overlay clad of the pressure vessel of the nuclear reactor is identified from the medium value or the half value width of the distribution of the magnetic field thus measured.

3 Claims, 5 Drawing Sheets

APPARATUS FOR MEASURING THE THICKNESS OF THE OVERLAY CLAD IN A PRESSURE VESSEL OF A NUCLEAR REACTOR

BACKGROUND OF THE INVENTION

1. Field of the Invention

The present invention relates to a method of and an apparatus for measuring in a non-destructive manner the thickness of the overlay clad of the pressure vessel of a nuclear reactor.

2. Prior Art

An overlay clad of stainless steel is provided on the inside of a vessel made of a low alloy steel in a pressure vessel of a nuclear reactor and it is necessary to measure in a non-destructive manner the thickness of the overlay clad in the course of the testing of the soundness of this pressure vessel of the nuclear reactor. According to a prior-art, in ultrasonic wave measurement method has been proposed which method utilizes the reflection of the ultrasonic wave from the interface between the overlay clad and the low alloy steel.

According to the ultrasonic wave measurement method of a prior art, since the densities of and the sonic velocities in the stainless steel and the low alloy steel are respectively almost the same as each other, the reflection of the ultrasonic wave from the interface of the stainless steel and the low alloy steel where they are well integrated by means of weld penetration is not sufficient to allow accurate measurement. In fact, the thickness of the overlay clad of the stainless steel applied to the inner surface of the pressure vessel of a nuclear reactor is in the order of 5–10 mm and measurement of the thickness of that overlay clad is preferably executed with a resolution in the order of 0.1 mm for practical usage. It is to be pointed out, however, that the ultrasonic wave measurement method according to a prior art is unable to attain such a desired accuracy.

SUMMARY OF THE INVENTION

An object of the present invention is to provide a method of and an apparatus for measuring the thickness of the overlay clad of the pressure vessel of a nuclear reactor with a favorable accuracy by solving the drawbacks above pointed out.

In order to attain the above-mentioned object, the method according to the present invention of measuring the thickness of the overlay clad of the pressure vessel of a nuclear reactor comprises the steps of: placing a magnetic yoke having an appropriate length and cross-sectional area of the magnetic path closely in contact with or in proximity to the surface of the overlay clad of said pressure vessel of the nuclear reactor to form a magnetic path by said magnetic yoke and said pressure vessel of the nuclear reactor; magnetizing said magnetic yoke; measuring the distribution of the magnetic field on or in proximity of the surface of said overlay clad closely in contact with which or in proximity with said magnetic yoke is placed; and identifying from the distribution of the magnetic field thus measured the thickness of the overlay clad of said pressure vessel of the nuclear reactor.

In order to attain the above-mentioned object, the apparatus according to the present invention for measuring the thickness of the overlay clad of the pressure vessel of a nuclear reactor comprises: a magnetic yoke having an appropriate length and cross-sectional area of the magnetic path, said magnetic yoke being placed closely in contact with or in proximity with the surface of said overlay clad of said pressure vessel of the nuclear reactor to form a magnetic path by said magnetic yoke and said pressure vessel of the nuclear reactor and said magnetic yoke further having at least one exciting coil for causing said magnetic yoke to be magnetized; and a means for measuring the distribution of the magnetic field on or in proximity with the surface of said overlay clad closely in contact with which or in proximity with which said magnetic yoke is placed.

The present invention applies the fact as described later that a magnetic yoke having an appropriate length and cross-sectional .area of the magnetic path is placed closely in contact with or in proximity with the surface of the overlay clad of the pressure vessel of a nuclear reactor to form a magnetic path by said magnetic yoke and said pressure vessel of the nuclear reactor, and the magnetic yoke is then magnetized, whereby the distribution of the magnetic field thus generated on or in proximity of the surface of the overlay clad closely in contact with which or in proximity with which the magnetic yoke is placed will be subject to variation only by the thickness of the overlay clad if the geometrical dimension and the magnetic characteristics of the material of the magnetic yoke and the pressure vessel of the nuclear reactor are decided.

Accordingly, in the method according to the present invention for measuring the thickness of the overlay clad of the pressure vessel of a nuclear reactor, in accordance with the construction as described above, the magnetic yoke is placed closely in contact with or in proximity with the surface of the overlay clad of the pressure vessel of a nuclear reactor to form a magnetic path by means of the magnetic yoke and the pressure vessel of the nuclear reactor, and the magnetic yoke is then magnetized, whereby the distribution of the magnetic field thus generated on or in proximity with the surface of the overlay clad closely in contact with which or in proximity with which the magnetic yoke is placed is measured, and, because the distribution of the magnetic field thus measured varies only depending on the thickness of the overlay clad due to the geometrical dimension and the magnetic characteristics of the material of the magnetic yoke and the pressure vessel of the nuclear reactor being determined in advance, the thickness of the overlay clad of the pressure vessel of the nuclear reactor is identified. Therefore, the method according to the present invention of the measurement makes it possible to measure the thickness of the overlay clad of the pressure vessel of a nuclear rector with a practically desired accuracy, for example, the resolution of 0.1 mm relative to the thickness of the overlay clad of 5–10 mm.

Furthermore, in the apparatus according to the present invention for measuring the thickness of the overlay clad of the pressure vessel of a nuclear reactor, the magnetic yoke is placed closely in contact with or in proximity with the surface of the overlay clad of the pressure vessel of a nuclear reactor to form a magnetic path by means of the magnetic yoke and the pressure vessel of the nuclear reactor, and the magnetic yoke is then magnetized by the exciting coil to generate a magnetic field on or in proximity with the surface of the overlay clad closely in contact with which or in proximity with which the magnetic yoke is placed, and the distribution of the magnetic field thus generated is measured by the measuring means of the distribution of the magnetic field. Accordingly, the measuring apparatus is capable of accurately measuring the distribution of the magnetic field generated on or in proximity with the surface of the overlay clad closely in contact with which or in proximity with which the magnetic yoke in placed, the distribution of the magnetic field being variable only depending on the thickness of the overlay clad of the pressure vessel of the nuclear reactor.

These and other objects and advantages of the present invention will be made apparent upon reading the following description of the present invention with reference to the accompanied drawings.

DETAILED DESCRIPTION OF THE PREFERRED EMBODIMENTS

The principle of the present invention will firstly be explained.

Figure 1:
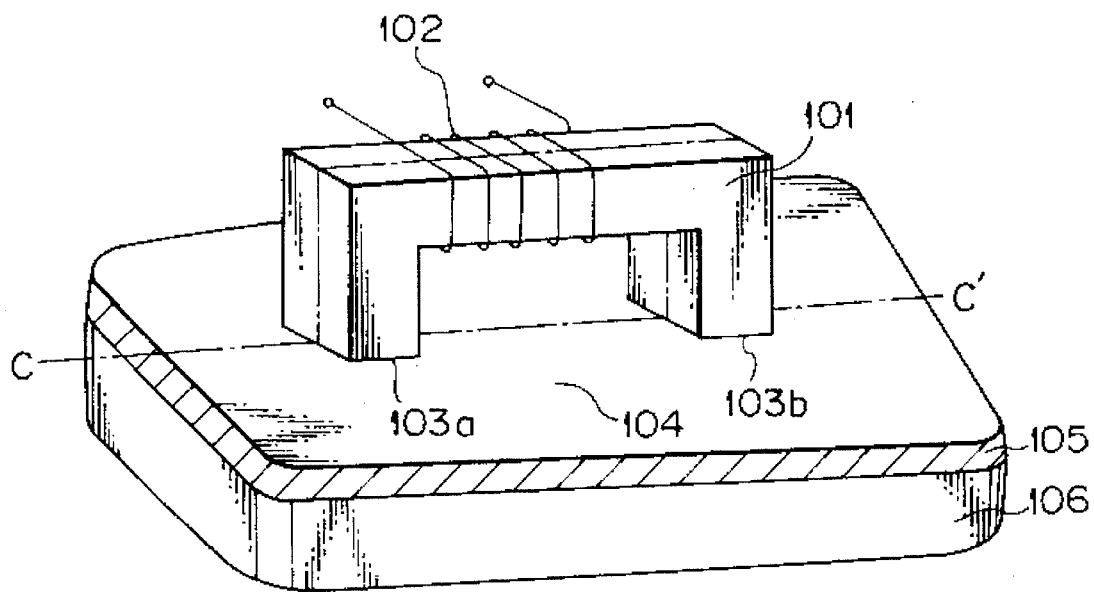
FIG. 1 is a view explaining the principle of the present invention and is a perspective view of a magnetic yoke having an appropriate length and cross-sectional area of the magnetic path and an exciting coil, the magnet yoke being placed closely in contact with the inner wall of the pressure vessel of a nuclear reactor.

FIG. 1 is a perspective view showing a magnetic yoke having an appropriate length and cross-sectional area of the magnetic path and an exciting coil, the magnetic yoke being placed closely in contact with the interior of the pressure vessel of a nuclear reactor, the pressure vessel being shown in a fragmentary sectional view. In FIG. 1, the reference numeral 101 designates a magnetic yoke, the numeral 102 an exciting coil, the numerals 103a and 103b the portions of the magnetic yoke 101 adapted to be closely placed in contact with the pressure vessel of the nuclear reactor, the numeral 104 the inner wall surface of the pressure vessel of the nuclear reactor, the numeral 105 an overlay clad of the inner wall of the pressure vessel of the nuclear reactor and the numeral 106 a vessel section of the pressure vessel of the nuclear reactor.

Figure 2:
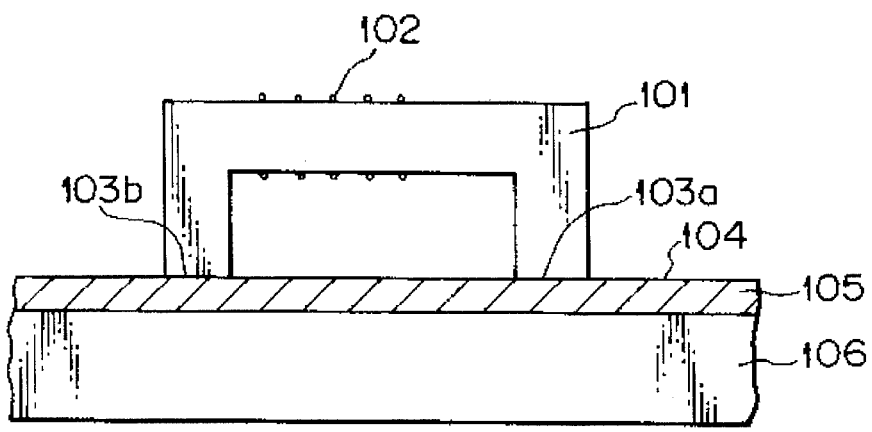
FIG. 2 is a sectional view taken along the line C—C' passing through the center of the magnetic yoke 101 shown in FIG. 1.

FIG. 2 is a sectional view taken along the line C—C' which passes through the center of the magnetic yoke 101 shown in FIG. 1. In FIGS. 1 and 2, the overlay clad 105 is made of non-magnetic stainless steel while the vessel section 106 is made of a low carbon, ferromagnetic low alloy steel.

Figure 3:
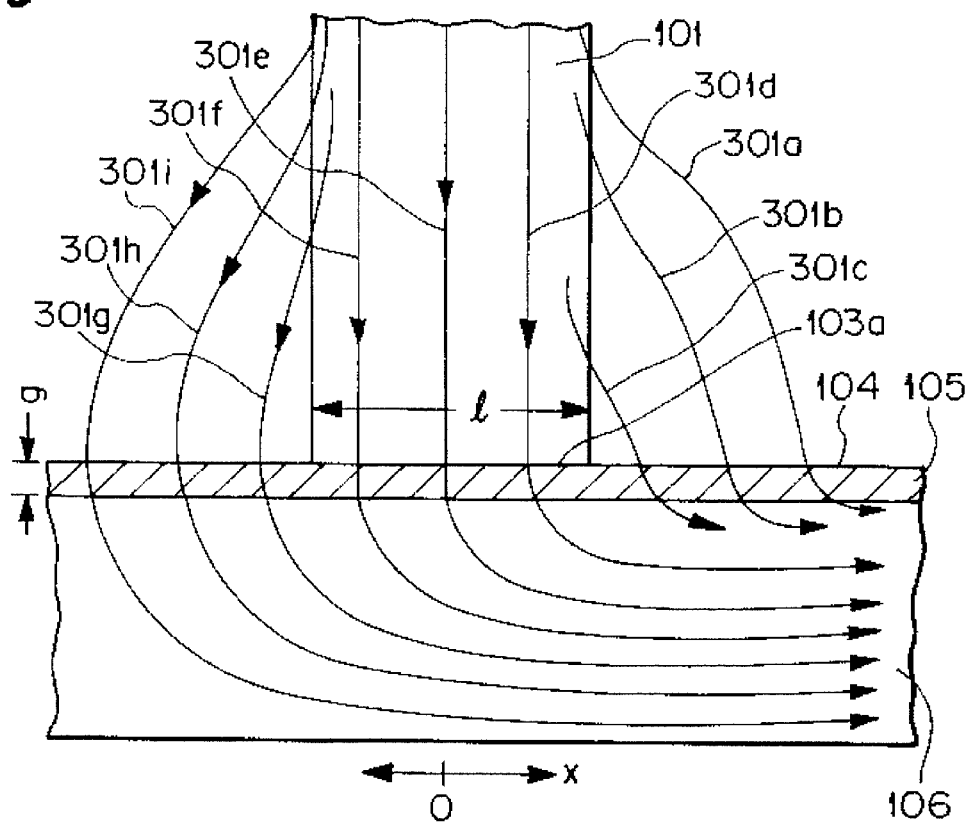
FIG. 3 is a view explaining the magnetic fluxes flowing from the magnetic yoke 101 to the overlay clad 105 of non-magnetic stainless steel and the vessel section 106 comprised of the low alloy steel when the magnetic yoke 101 is magnetized by flowing exciting current through the exciting coil 102 in the condition shown in FIGS. 1 and 2.

In the condition shown in FIGS. 1 and 2, if an exciting current is caused to flow through the exciting coil 102 and the magnetic yoke 101 is magnetized thereby, the magnetic fluxes flow as shown in FIG. 3 from the magnetic yoke 101 to the overlay clad 105 of the non-magnetic stainless steel and the vessel section 106 of the low carbon steel. In FIG. 3, the reference numerals 301a through 301i designate the flow of the magnetic fluxes, the symbol g the thickness of the overlay clad 105, the symbol l the length in the direction of the line C—C' of the closely contract portion 103a of the magnetic yoke 101 placed closely in contact with the pressure vessel of the nuclear reactor and the symbol x the distance in the direction of the line C—C' from the half point of l as the reference.

Figure 4:
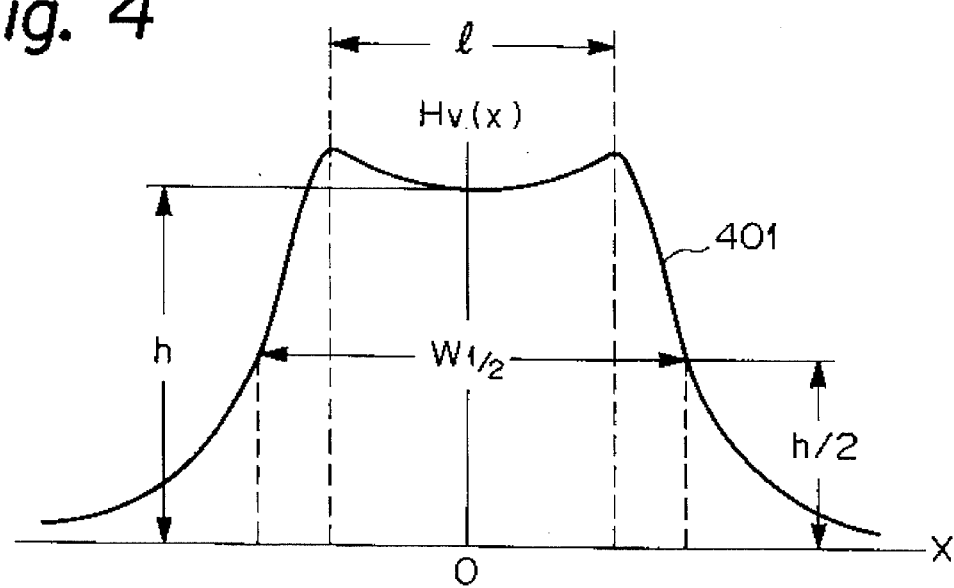
FIG. 4 is a view explaining the spatial distribution Hv(x) of the magnetic field component orthogonally crossing with the inner wall surface 104 of the pressure vessel of the nuclear reactor in the condition of the magnetic fluxes flowing as shown in FIG. 3.
Figure 5:
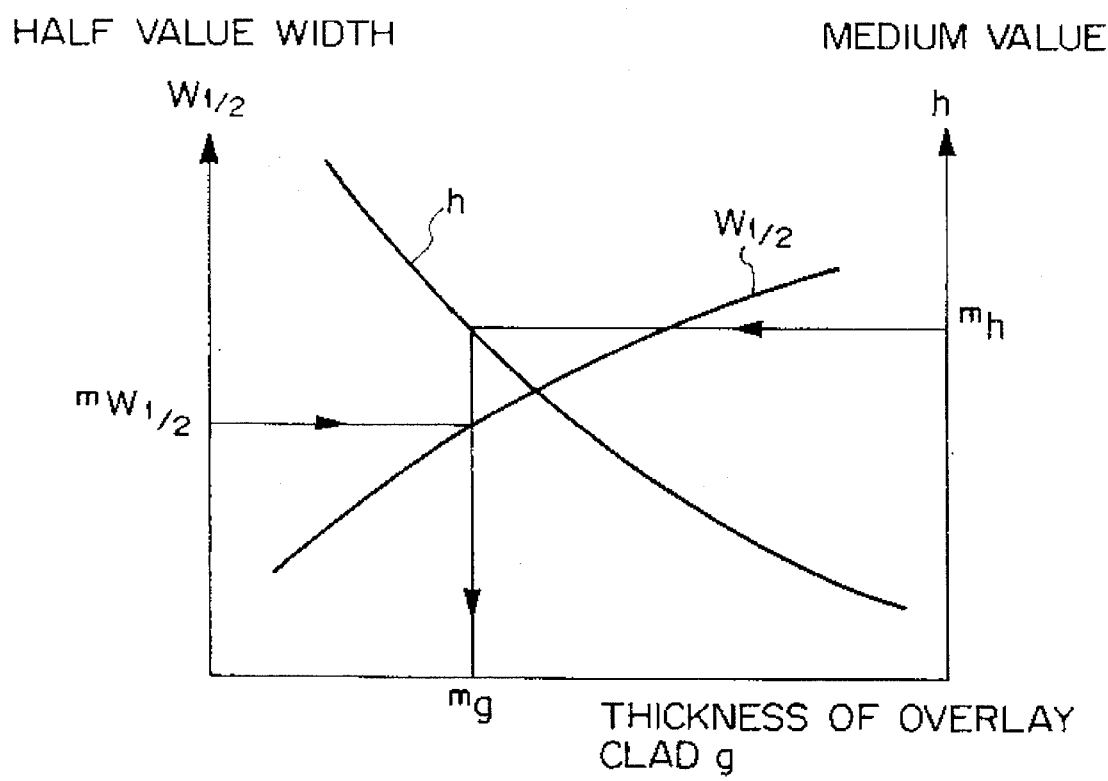
FIG. 5 is a view explaining the relation of the thickness g of the overlay clad 105 relative to the medium value h and the half value width $W_{1/2}$ of the spatial distribution Hv(x) of the magnetic field component orthogonally crossing with the inner wall surface 104 of the pressure vessel of the nuclear reactor in the case that the geometrical dimension and the magnetization characteristics of the material of the magnetic yoke 101 and the pressure vessel of the nuclear reactor are determined.

In this case, the spatial distribution Hv(x) of the magnetic field component orthogonally crossing with the inner wall surface 104 of the pressure vessel of a nuclear reactor is represented by the curve 401 in FIG. 4. And it is to be noted that the medium value h of the spatial distribution Hv(x) at the point x=0, and the half value width $W_{1/2}$ indicating the distance between two points in the direction of x where the magnitude of the spatial distribution Hv(x) are h/2 varies only along with the thickness g of the overlay clad 105 if the geometrical dimension and the magnetic characteristics of the material of the magnetic yoke 101 and of the pressure vessel of the nuclear reactor are determined, and such a relation can be as shown in FIG. 5. This relation can be readily predetermined by using a static magnetic field analysis method such as the definite element method, the boundary element method or the like. Accordingly, if the measured value $^m h$ or $^m W_{1/2}$ respectively of the medium value h or the half value width $W_{1/2}$ of the spatial distribution Hv(x) of the magnetic field are obtained by measuring the distribution of the magnetic field, the value $^m g$ of the thickness of the overlay clad 105 can be known.

Figure 6:
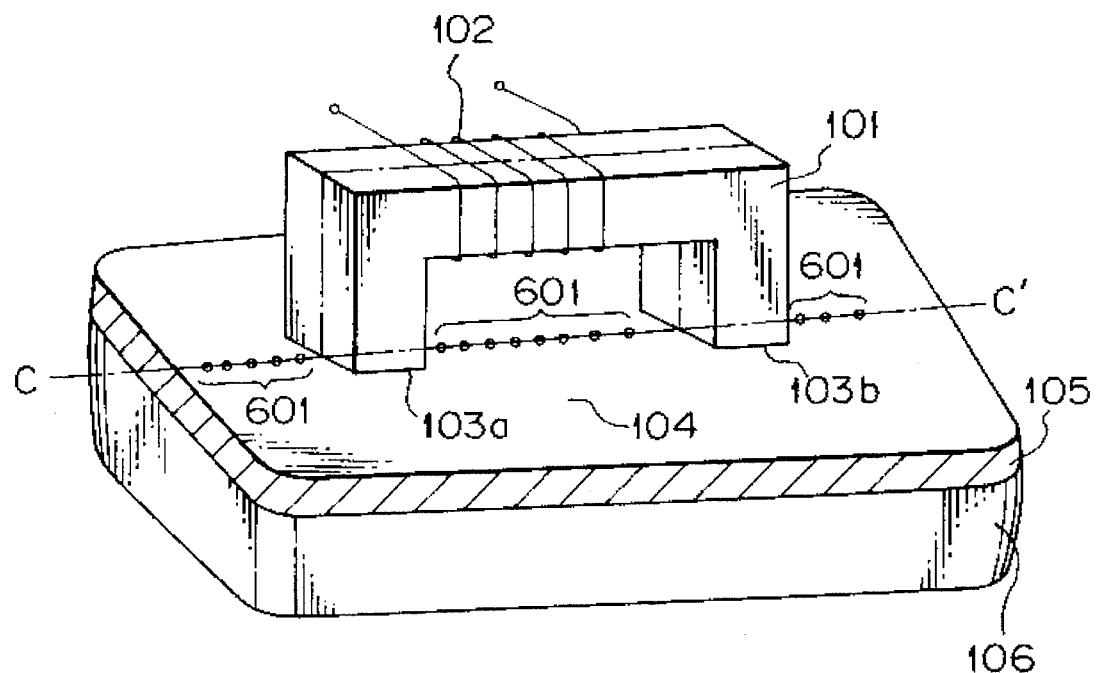
FIG. 6 illustrates an embodiment of the present invention in accordance with the principle shown in FIG. 1.

The first embodiment of the present invention based on the above-mentioned principle is illustrated in FIG. 6. In FIG. 6, reference numerals identical to those shown in FIG. 1 designate; the same components as those designated by the same reference numerals shown in FIG. 1. The present embodiment is characterized in that a plurality of magnetic field sensors 601 are disposed along the straight line defined on the inner wall surface 104 of the pressure vessel of the nuclear reactor by the central plane C—C' of the magnetic yoke in the system shown in FIG. 1.

Figure 7:
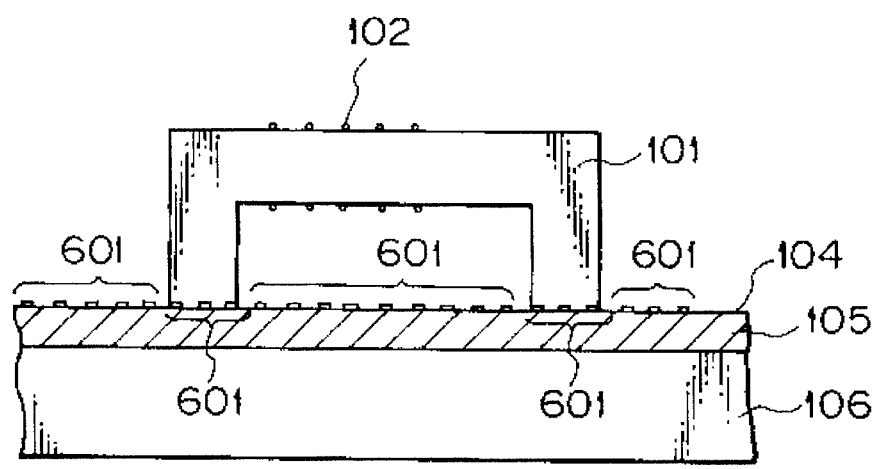
FIG. 7 is a sectional view taken along the line C—C' which passes through the center of the magnetic yoke 101 shown in FIG. 6.

FIG. 7 is a sectional view taken along the line C—C' passing through the center of the magnetic yoke 101 shown in FIG. 6. The spatial distribution of the magnetic field component orthogonally crossing with the inner wall surface 104 of the pressure vessel of the nuclear reactor is measured by a group of the magnetic field sensors 601. Then, the thickness of the overlay clad 105 can be obtained from the medium value h or the half value width $W_{1/2}$ of the measured spatial distribution of the magnetic flux component, by using the relationship between the medium value h or the half value width $W_{1/2}$ and the thickness g of the overlay clad 105 which has been determined in advance by the static field analysis. For the magnetic field sensors comprising the group of the magnetic field sensors 601, such comparatively cheap elements as Hall elements, magnetic resistance elements or the like can be used.

Figure 8:
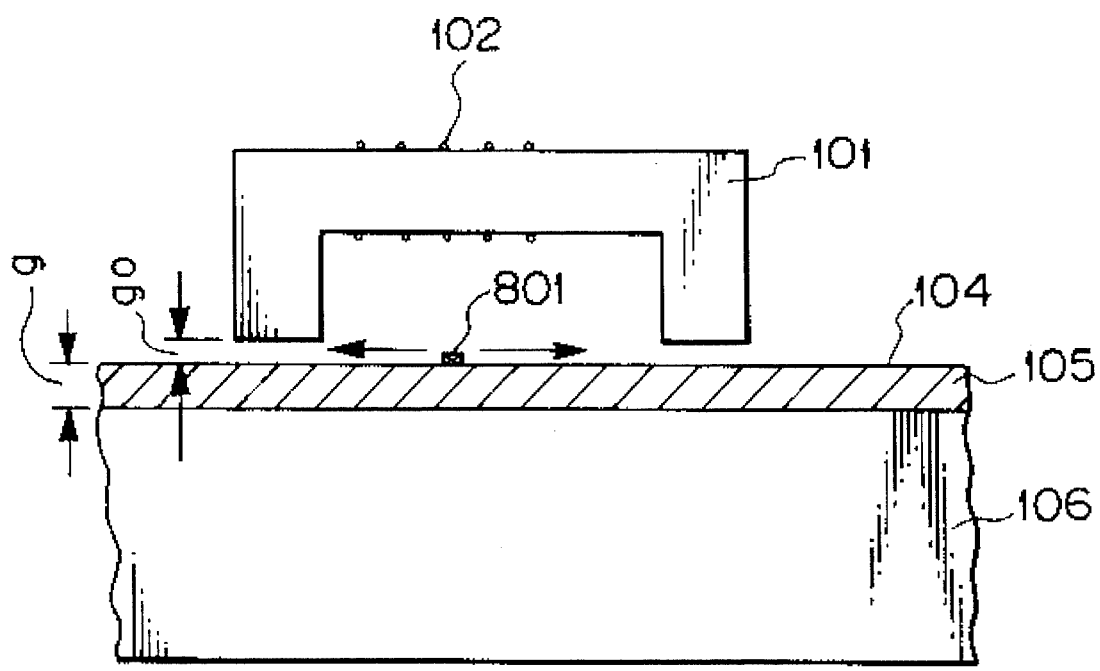
FIG. 8 illustrates a second embodiment of the present invention in accordance with the principle shown in FIG. 1.

The second embodiment of the present invention based on the above-mentioned principle is illustrated in FIG. 8. The present embodiment is characterized in that one magnetic field sensor 801 is used in place of a plurality of the magnetic field sensors 601 as a group employed in the first embodiment shown in FIG. 6 in such a manner as the magnetic field sensor 801 is travelled on the inner wall surface 104 of the pressure vessel of the nuclear reactor so as to measure the spatial distribution of the magnetic field. In FIG. 8, reference numerals identical to those shown in FIG. 6 designate identical components to those designated by the same reference numerals as those shown in FIG. 6. According to the present embodiment, a clearance $g_o$ is required to allow the magnetic field sensor 801 to travel therethrough. However, since the clearance $g_o$ can be incorporated in the computation process to the static magnetic field analysis and then the relation between the medium value h or the half value width $W_{1/2}$ of the distribution of the magnetic field and the thickness g of the overlay clad 105 can be predetermined, there will be no problems.

The present invention having been described in a detailed by referring to certain preferred embodiments, it will be understood that changes and the modifications can be made within the spirit and the scope of the claims of the present invention.

What is claimed is:

1. An apparatus for measuring the thickness of a nonmagnetic overlay clad of a ferromagnetic pressure vessel of a nuclear reactor comprising:

a magnetic yoke;

one or more exciting coils, said coils wrapped around said magnetic yoke for magnetizing said magnetic yoke to form a magnetic path through said magnetic yoke and the ferromagnetic pressure vessel of the nuclear reactor;

means for measuring the spatial distribution of the magnetic field component orthogonally crossing the ferromagnetic pressure vessel of the nuclear reactor.

2. An apparatus is in claim 1, wherein said means for measuring the spatial distribution of the magnetic field component orthogonally crossing the ferromagnetic pressure vessel of the nuclear reactor is a plurality of magnetic field sensors placed in a line along the longitudinal direction of said magnetic yoke above the nonmagnetic overlay clad.

3. An apparatus is in claim 1, wherein said means for measuring the spatial distribution of the magnetic field component orthogonally crossing the ferromagnetic pressure vessel of the nuclear reactor is a single magnetic field sensor moveable along the longitudinal direction of said magnetic yoke above the nonmagnetic overlay clad.

* * * * *